United States Patent [19]

Levy

[11] Patent Number: 4,510,300

[45] Date of Patent: Apr. 9, 1985

[54] PERFLUOROCARBON COPOLYMER FILMS

[75] Inventor: Stanley B. Levy, Wilmington, Del.

[73] Assignee: E. I. Du Pont de Nemours and Company, Wilmington, Del.

[21] Appl. No.: 469,899

[22] Filed: Mar. 3, 1983

Related U.S. Application Data

[63] Continuation-in-part of Ser. No. 366,660, Apr. 8, 1982, abandoned.

[51] Int. Cl.³ .............................................. C08F 14/26
[52] U.S. Cl. .................................. 526/247; 264/127; 264/235; 264/342 R; 264/342 RE
[58] Field of Search ................ 526/247, 254; 264/127, 264/235, 342 R, 342 RE

[56] References Cited

U.S. PATENT DOCUMENTS

| | | | |
|---|---|---|---|
| Re. 27,028 | 1/1971 | Ely, Jr. et al. | 138/118 |
| Re. 28,628 | 11/1975 | Carlson et al. | 204/159.2 |
| 2,435,537 | 2/1948 | Ford et al. | 260/92.5 |
| 2,776,465 | 1/1957 | Smith | 28/82 |
| 2,792,377 | 5/1957 | Miller | 260/33.8 |
| 3,196,194 | 7/1965 | Ely, Jr. et al. | 264/95 |
| 3,197,538 | 7/1965 | Capron et al. | 264/288 |
| 3,265,092 | 8/1966 | Ely, Jr. et al. | 138/118 |
| 3,313,230 | 4/1967 | Simijian | 99/375 |
| 3,315,020 | 4/1967 | Gore | 264/127 |
| 3,322,113 | 5/1967 | Simijian | 126/390 |
| 3,417,176 | 12/1968 | Anderson et al. | 264/230 |
| 3,426,118 | 2/1969 | Chapman et al. | 264/230 |
| 3,426,119 | 2/1969 | Chapman et al. | 264/230 |
| 3,499,185 | 3/1970 | Schmidt et al. | 18/1 |
| 3,500,870 | 3/1970 | Ely, Jr. et al. | 138/177 |
| 3,624,250 | 11/1971 | Carlson | 264/80.75 |
| 3,659,000 | 4/1972 | Cronk | 156/229 |
| 3,677,845 | 7/1972 | Roberts | 156/3 |
| 3,707,592 | 12/1972 | Ishii et al. | 264/210 |
| 3,770,711 | 11/1973 | Hartig et al. | 260/87.5 |
| 3,786,127 | 1/1974 | Peet et al. | 264/288 |
| 3,796,784 | 3/1974 | Rest et al. | 264/288 |
| 3,869,534 | 3/1975 | Yoshikawa et al. | 264/210 |
| 3,878,274 | 4/1975 | Murayama et al. | 264/2 |
| 3,925,339 | 12/1975 | Ishii et al. | 260/92.1 |
| 3,934,748 | 1/1976 | Racz | 220/9 |
| 3,941,546 | 3/1976 | Hartig | 425/387 |
| 3,981,233 | 9/1976 | Nugarus | 99/422 |
| 3,991,451 | 11/1976 | Maruyama et al. | 29/25.42 |
| 4,049,589 | 9/1977 | Sakane | 264/127 |
| 4,064,214 | 12/1977 | FitzGerald | 264/147 |
| 4,094,949 | 6/1978 | Yokokawa et al. | 264/234 |
| 4,151,245 | 4/1979 | Suzuki | 264/288 |
| 4,241,128 | 12/1980 | Wang | 428/212 |
| 4,248,924 | 2/1981 | Okita | 428/212 |
| 4,250,605 | 2/1981 | Chapman | 29/132 |
| 4,268,653 | 5/1981 | Uchidoi et al. | 526/255 |
| 4,277,429 | 7/1981 | Okita | 264/127 |
| 4,290,983 | 9/1981 | Sasaki et al. | 264/22 |
| 4,302,556 | 11/1981 | Endo et al. | 525/199 |
| 4,308,370 | 12/1981 | Fukada et al. | 526/255 |
| 4,320,699 | 3/1982 | Binks | 99/349 |
| 4,325,998 | 4/1982 | Chapman | 428/36 |

FOREIGN PATENT DOCUMENTS

| | | |
|---|---|---|
| 23578 | 6/1980 | Japan |
| 8036493 | 9/1980 | Japan |
| 1069690 | 5/1967 | United Kingdom |
| 1136866 | 12/1968 | United Kingdom |
| 1173688 | 12/1969 | United Kingdom |
| 1471397 | 4/1977 | United Kingdom |
| 2065140A | 11/1979 | United Kingdom |

OTHER PUBLICATIONS

Structure and Properties of Oriented Polymers, Chapter 12, pp. 413–423, (1975).

Research Disclosure, Product Licensing Index, Aug. 1972.

"Tetrafluoroethylene Copolymers with Ethylene", Encyclopedia of Polymer Science and Technology, Supplement 1, Copyright 1976, John Wiley and Sons Publishers.

*Primary Examiner*—Paul R. Michl

[57] ABSTRACT

A perfluorocarbon copolymer film which, upon heat shrinking, does not expand in the direction perpendicular to stretching.

39 Claims, 2 Drawing Figures

PERFLUOROCARBON COPOLYMER FILMS

CROSS REFERENCE TO RELATED CASES

This application is a continuation-in-part of application Ser. No. 366,660, filed Apr. 8, 1982, now abandoned.

BACKGROUND OF THE INVENTION

This invention relates to perfluorocarbon copolymer films and a process for their preparation.

Films of melt fabricate perfluorocarbon copolymers such as those made from tetrafluoroethylene/perfluoro(alkyl vinyl ether), tetrafluoroethylene/hexafluoropropylene and tetrafluoroethylene/hexafluoropropylene/perfluoro(alkyl vinyl ether) copolymers, are well known in the art. These copolymers are melt extruded through an orifice to form a film and then quenched, such films being useful for chemical shielding, release surfaces and specialty glazing. These films, however, suffer the disadvantage of having excessive creep, i.e., deformation under moderate loading over extended time periods, and an extremely low tensile modulus.

Further, perfluorocarbon copolymers have been extruded in tubular form and blown to about twice the diameter of the unblown tubing, thereby increasing the strength of the film and allowing the blown tubing to be heat-shrunk around, e.g., process rolls in order to impart a protective, low friction surface to such rolls. Upon heating, however, such films tend to expand in the direction perpendicular to the direction of stretching effected by blowing and, hence, are not practical for heat shrinking around rectangular surfaces where tension in such perpendicular direction is required to hold the film taut.

Also, U.S. Pat. No. 3,770,711 mentions uniaxially stretching a film of tetrafluoroethylene/hexafluoropropylene copolymer up to about 40 percent, and tetrafluoroethylene/perfluoro-(propyl vinyl ether) copolymer up to 250 percent, in a tensile tester. These films, however, as seen below, also expand in the direction perpendicular to stretching upon heating.

SUMMARY OF THE INVENTION

In accordance with the subject invention, a film of a perfluorocarbon copolymer is provided, which film, upon heating, shrinks when shrinkage is measured in one direction and does not expand in a direction perpendicular to that of first direction. Further, the film's tensile modulus measured in said perpendicular direction remains comparable to the modulus measured in the first direction and the creep resistance measured in said perpendicular direction shows significant improvement. These properties are unexpected.

In a preferred embodiment, the subject invention is a film of a melt-fabricable perfluorocarbon copolymer having shrinkage of 0 to 10 percent in the direction perpendicular to the direction of stretching (hereinafter called "transverse" direction), and shrinkage of at least 20 percent in the direction of stretching (hereinafter called "longitudinal" direction), when heated for 2 minutes at about 50° C. below the crystalline melting point of the polymer and, preferably, a transverse tensile modulus greater than 70 percent of the longitudinal tensile modulus at room temperature and at least a two-fold improvement in transverse creep resistance over that of the unstretched film. Also provided is a process for the production of these films, as well as a process by which these films are heat set. Also provided are thermally dimensionally stable films.

DETAILED DESCRIPTION

Figure 1:
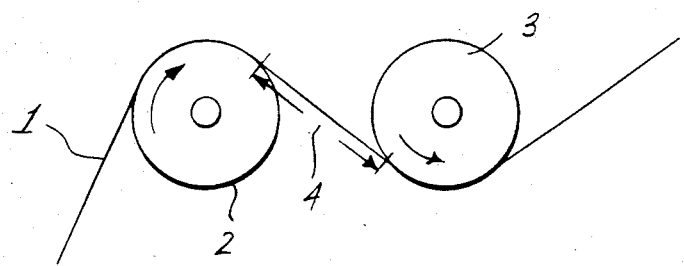
FIG. 1 illustrates one stretching assembly useful in the practice of the subject invention.

The perfluorocarbon copolymers useful in the practice of the subject invention include those melt-fabricate copolymers formed by copolymerization of tetrafluoroethylene with at least one perfluorinated ethylenically unsaturated comonomer. Useful comonomers include those of the formulae

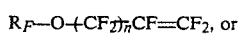

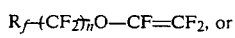

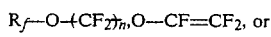

mixtures thereof,
wherein n is a cardinal number of 0–10 inclusive and n' is a cardinal number of 1–10, and $R_f$ is perfluorinated alkyl of 1 to 8 carbon atoms inclusive of ω-hydroperfluorinated alkyl of 1 to 8 carbon atoms, inclusive. Preferably $R_f$ is perfluorinated alkyl of 1 to 8 carbon atoms inclusive. Preferred classes of comonomers include ones selected from the group consisting of perfluoro(alkyl vinyl ether) comonomers where the alkyl group has 1 to 18 carbon atoms, [These have the formula—$R_f(CF_2)_nO$—$CF$=$CF_2$, and may also include multiple ether groups and cyclic ethers]; α-perfluoroalkene comonomers have 3 to 18 carbon atoms [these have the formula $R_f(CF_2)_n$—$CF$=$CF_2$], or any combination of these comonomers to form copolymers from more than one of these comonomers.

Most preferred are those copolymers formed by the copolymerization of tetrafluoroethylene with 5 to 15% hexafluoropropylene or 0.4 to 5% perfluoro(alkyl vinyl ether) to form the dipolymer, or a combination of these comonomers to form the terpolymer (as used herein, percentages of comonomer are in mole percent). These copolymers generally have specific melt viscosities of $1 \times 10^3$ to $1 \times 10^7$ poises at 372° C., and thus are melt-fabricable (i.e., can be fabricated into articles by melting and shaping). Of course, the crystalline melting point of any of these copolymers depends upon the amount of comonomer present, generally speaking, the more such comonomer present, the lower the crystalline melting point. These copolymers also have second order transition temperatures of 85° to 100° C. (both crystalline melting point and second order transition temperature measured using conventional differential scanning calorimetry. The melting point is the peak of the endotherm in the scan). The preparation of these copolymers is well known as detailed in U.S. Pat. Nos. 3,132,123; 3,528,954; and 3,528,924.

The formation of perfluorocarbon copolymer films is also well known in the art. Generally speaking, the polymer is extruded in melt form from an orifice and quenched to well below its melting point. The extrusion orifice can be such that the film produced is in flat sheet or tubular form. The film thickness will generally be between 0.5 and 100 mils before stretching and about 0.05 and 20 mils after stretching. If tubular film is to be stretched in accordance with the subject invention, the tube may first be collapsed and laid flat, or be slit and opened into flat sheet form.

The films that are subjected to the stretching procedures described herein are substantially unstretched films. In other words the films are "as-cast" films which have low moduli and strength. Normally, these films have moduli of about 500 MPa in the transverse and longitudinal direction, and exhibit a dimensional stability of about ±2.0 percent in each direction when heated at about 50° C. below the crystalline melting point (a negative dimensional change represents expansion).

The process of the subject invention can best be described by reference to the Figures. In FIG. 1, perfluorocarbon film 1 is transported into contact with and partially around roll 2, into contact with and partially around roll 3, and under tension to some conventional wind-up means. Rolls 2 and 3 are aligned parallel with each other and, to effectuate uniaxial stretching of film 1 is stretch zone 4, the peripheral drive speed of roll 2 is slower than that of roll 3, the difference in peripheral drive speeds being such that the film is stretched to between about 2.5 times the length of the unstretched film on up to the break point of the film. This break point for many films covered herein is about 4.5 times the length of unstretched films. Of course, multiple rolls may also be used to effectuate this stretching.

To prevent slippage of film 1 on rolls 2 or 3, the film is contacted with the rolls under pressure as, for example, by the partial wrapping of the film around rolls 2 and 3 as seen in FIG. 1. Alternatively, conventional nip rolls may be used to force film 1 onto either or both rolls.

The film must be heated to a temperature at least about 40° C. above, and no greater than about 80° C. above the second under transition temperature of the polymer in order to accomplish the desired stretching. Preferably, this stretching temperature is between 145° and 155° C. The film need be at stretch temperature when it enters stretch zone 4. The heating can be accomplished by, e.g., heating roll 2 or by housing the stretching apparatus depicted in FIG. 1 in an oven.

To exhibit the shrinkage characteristics in the film as a result of stretching, the film must be held under tension until cooled to below the second order transition temperature of the polymer. This is accomplished by conventional cooling means applied between roll 3 and the wind-up means or, alternatively roll 3 may act as a cooling means. As is common with stretched film, the very edges of the film are of non-uniform gauge relative to the remainder of the film. These edges, or "beads", are generally trimmed prior to packaging the wound film.

Figure 2:
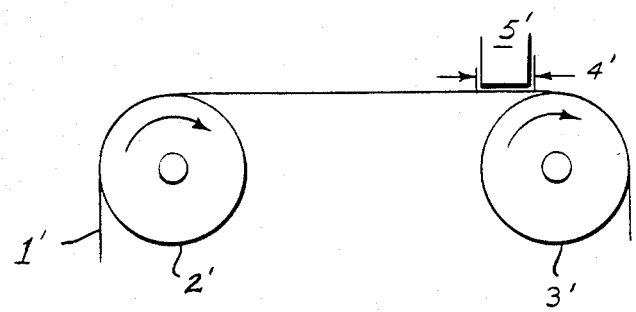
FIG. 2 illustrates another stretching assembly useful in the practice of the subject invention.

In FIG. 2, illustrating an alternative stretching assembly for use in the process of the subject invention, perfluorocarbon film 1' is transported into contact with and over roll 2', into contact with and over roll 3', and under tension to some conventional wind-up means. Again, rolls 2', and 3' are aligned parallel with each other and, to effectuate uniaxial stretching of film 1' in stretch zone 4', the peripheral drive speed of roll 2' is slower than that of roll 3'. In this assembly, the film is heated to the stretching temperature by radiant heater 5'.

A critical aspect of the subject invention is the ratio of the width of the film to be stretched to the length of the stretch zone, the stretch zone being defined as the length of film which is allowed to stretch at any given instant, as illustrated in the Figures as the length of film in stretch zones 4 and 4'. The result of too small a ratio, as seen below, is a film which, when re-heated, shrinks in the direction of stretching but expands in the direction perpendicular to stretching. For purposes of the subject invention, the ratio of film width to stretch zone length need be greater than about 3, preferably greater than about 10. Of course, if a partial wrap-around stretching apparatus, as illustrated in FIG. 1, is to be used, the distance between the two rolls need only be greater than the thickness of the film in order for the film to pass between the rolls.

Another critical aspect of the subject invention is the degree of uniaxial stretching. Perfluorocarbon film stretched less than about 2.5 times its original length (about 2.6 for tetrafluoroethylene/hexafluoropropylene copolymer film), tends to expand upon heating in the direction perpendicular to stretching. When an attempt is made to stretch perfluorocarbon film greater than about 4.5 times its unstretched length, the film will break at some point.

In the film of this invention, the tensile modulus in the direction perpendicular to the stretching, i.e., the transverse direction (TD), increases with stretch ratio and, upon completion of the uniaxial stretching as described above, remains greater than 70 percent of the tensile modulus in the direction of stretching, i.e., the longitudinal direction (LD). The result is surprising as it has generally been found that uniaxial stretching does not substantially alter the transverse tensile modulus.

Further, the films of this invention exhibit transverse shrinkage of 0 to 10 percent, and longitudinal shrinkage of at least 20 percent, when heated for 2 minutes at about 50° C. below the crystalline melting point of the polymer. In contrast, stretched perfluorocarbon film manufactured in the processes of the prior art expands in the transverse direction when heated to similar temperatures due to the small film width to stretch zone length ratio employed therein.

Also, excessive creep rates have been detrimental to the performance of as-cast perfluorocarbon films. Although uniaxial stretching is expected to improve tensile creep resistance in the direction of stretching, a surprising result of the uniaxial stretching of the process of subject invention after about a 150 percent stretch is an up to two fold improvement in transverse tensile creep resistance of perfluorocarbon film (all creep rate measurements reported herein taken at room temperature). That is, the creep rate is one-half or less, the creep rate of an as-cast film as measured by ASTM D-674 at 1000 hours under a load of 10 MPa.

The uniaxially stretched film produced in accordance with the procedure above can be heat set in any conventional manner to enhance dimensional stability. For example, the film can be run over a pair of rolls, the first heated to a heat set temperature about 5° C. below the crystalline melt temperature of the polymer, the second, acting as a cooling roll, having a temperature below the second order transition temperature of the polymer. The peripheral drive speeds of these rolls may be approximately equal to allow what is known in the art as stress relaxation or, alternatively, the second roll may be run at a speed slightly slower than the first to allow what is known as strain relaxation. The time of heat setting is not important, but can be as little as 0.1 seconds depending on the temperature. On the other hand, the dwell time on the first roll may be about 2-5 seconds, if desired.

The test for determining dimensional stability of a film is as follows:

Three 10 cm × 10 cm samples are cut from the material, one from the middle and one from near each edge. They are placed in an oven at the designated temperature for a period of 30 minutes with no restraint. After removal and air cooling, the samples are measured in both the LD and TD; five measurements at equally spaced intervals are made in each direction, at 1, 3, 5, 7 and 9 cm. For each sample a percentage dimensional change is calculated and the results averaged in each direction. When so tested, the heat set films are dimensionally stable and exhibit a transverse dimensional change of between 2 and −2% and a longitudinal dimensional change of 0 to 5%, when heated for thirty minutes at 200° C. Further, the transverse tensile modulus remains within 70 percent of the longitudinal tensile modulus and in most cases the moduli values increase. Surprisingly, the edge thickening, or "bead" effect evident after the uniaxial stretching detailed above is reduced, and in some cases eliminated, by the heat setting of the perfluorocarbon copolymer films. This bend elimination results in improved transverse gauge uniformity not generally evidenced with stretched, heat set film of the past.

The lack of transverse expansion, and in most cases positive transverse shrinkage, of the films of the subject invention allows those films to be fit, e.g., around window casings, around cooking surfaces, over domed frames etc., and heat shrunk, thereby causing the film to draw taut. The high transverse tensile modulus allows the film to withstand conversion induced stresses, distortion and warpage, complementing the well known low friction, durable nature of these fluorocarbon polymers. Finally, the two dimensional creep resistance of the films of the subject invention reduces the need for structural support for these films.

In general, the films of this invention are useful as carriers, electrical insulation, chemical barriers, thermal barriers, physical barriers, structural members, or as manufacturing aids in the following applications: wire bundling; insulation for wires, membrane switches, motor slots, flat cables, flexible printed circuits, capacitors, strain gauges, under-carpet wiring, transformers, ultrahigh voltage cable, cable splicing tapes, etc.; electrets; tamper resistant seals for outdoor use such as for utility meters and other tamper resistant seals; mica replacement; microwave lens/window (ovens/radomes); tubing (spiral wound, laminated, sealed); gaskets; diaphragms; heat exchangers; chemical reactors; linings; ducting; expansion joints; bags; sight-glass coverings; pond liners; shrinkable covers; column packing, e.g. for distillation; de-mist devices; pillows (evaporation control); flange safety covers; spill-control bladders; protective clothing; rupture disks; antistick/corrosion resistant surfacing or covering; pumps; windows and glazing; lighting lenses; solar collectors (glazing/reflector/absorber); coated film base; skylights; architectural panels; reflective film (metallized and laminated); green houses; covers for photovoltaic cells; sewage treatment enclosures; protective laminations (i.e., documents, signs, decals, labels); release films; metallizing carrier belt; cooking/heating equipment (UV, IR, electromagnetic); deicing surfaces; roll covering; solar sails; drafting film; safety shields for light and heat sources (bulbs, flame, etc.); chemical service; pressure sensitive tape base; belting; closures (cap liners); magnetic recording film bases; punch tape bases; interior surfacing (protective and decorative); yarn (slit film); strapping; packaging (chemical, medical, sterilizable, etc.); roll leaf carrier; enclosures (gloved containment boxes, oxygen tents, etc.); office machines (ribbon shield, etc.); appliance printed control panel; roofing; cross-ply sheeting; air barrier curtain; oven liners.

The subject invention will be more fully understood with reference to the Examples.

The test for determining the amount of shrinkage in a non heat set film is as follows:

Six 10 cm × 2.5 cm samples are cut from the material, three along the direction of stretch and three perpendicular to it. They are placed in an oven at about 50° C. below the crystalline melting point for a period of two minutes with no restraint. After removal and air cooling, the samples are measured in their long dimension. The percent shrinkage is calculated for two directions, and the results averaged for each direction (a negative shrinkage represents expansion).

EXAMPLE I

Films of tetrafluoroethylene/1.1 mole % perfluoro(propyl vinyl ether) copolymer (crystalline melting temperature of 305° C., specific melt viscosity of $20 \times 10^4$ poises at 372+ C.) film, 0.25 mm (10 mils) thick and tetrafluoroethylene/7% hexafluoropropylene copolymer (crystalline melting temperature of 275° C., specific melt viscosity of $30 \times 10^4$ poises at 372° C.) film, 0.25 mm (10 mils) thick, (both films being prepared by melt extruding onto a quench drum) were stretched at 150° C. by passing the film through a stretching apparatus as illustrated in FIG. 1. The ratio of film width to stretch zone length was 17. The following results were obtained (0% stretch indicating film as extruded, i.e., as cast).

The width of the film was 12 inches and the stretch zone was 0.69 inches.

TABLE I

| % Stretch | % Shrinkage Longitudinal Direction (LD) | % Shrinkage Transverse Direction (TD) | Modulus* LD (MPa) | Modulus TD (MPa) | % Creep,** 1000 hrs. TD | LD |
|---|---|---|---|---|---|---|
| Tetrafluoroethylene/perfluoro(propyl vinyl ether) copolymer (shrinkage at 260° C.) | | | | | | |
| 0 | 0.2 | 0.5 | 518 | 511 | 18 | 15 |
| 50 | 24 | −9.5 | 331 | 518 | 96 | 12 |
| 100 | 37 | −4.0 | 428 | 649 | 223 | 11 |
| 150 | 42 | 0 | 538 | 759 | 150 | 8 |
| 200 | 34 | 2.0 | 676 | 856 | 10 | 4 |
| 250 | 30 | 3.4 | 842 | 932 | 6 | 3 |
| 300 | 27 | 4.4 | 1035 | 994 | 7 | 2 |
| 350 | 25 | 5.0 | 1228 | 1035 | 4 | 3 |

TABLE I-continued

| % Stretch | % Shrinkage Longitudinal Direction (LD) | % Shrinkage Transverse Direction (TD) | Modulus* LD (MPa) | Modulus TD (MPa) | % Creep,** 1000 hrs. TD | % Creep,** 1000 hrs. LD |
|---|---|---|---|---|---|---|
| Tetrafluoroethylene/hexafluoropropylene copolymer (shrinkage at 225° C.) | | | | | | |
| 0 | 1 | .57 | 642 | 511 | 15 | 18 |
| 50 | 26 | −9 | 462 | 649 | *** | 6 |
| 100 | 29 | −8 | 511 | 704 | *** | 4 |
| 150 | 40 | −2.5 | 690 | 828 | 5 | 3 |
| 200 | 36 | 0 | 925 | 904 | 3 | 2 |
| 250 | 31 | 1.3 | 1132 | 959 | *** | 3 |
| 300 | 29 | 1.8 | | | | |

*ASTM D-882.
**ASTM D-674.
***No test data obtainable

COMPARATIVE EXAMPLE

Tetrafluoroethylene/perfluoro(propyl vinyl ether) copolymer film identical to that of Example I was stretched under the conditions of Example I except that the ratio of film width to stretch zone length was 0.9. Here, the stretch zone was 13.68 inches long and the film was 12 inches wide. Upon heating the film to 260° C., Transverse Direction (TD) expansion was evidenced as indicated below:

TABLE II

| % Stretch | % TD Shrinkage |
|---|---|
| 150 | −13.0 |
| 200 | −6.6 |
| 250 | −3.6 |
| 300 | −2.0 |
| 350 | −0.82* |

*Film breaks at greater than 350% stretch.

EXAMPLE II

Films of the copolymers described in Example I were stretched as described in Example I at 200% stretch. For the copolymer of tetrafluoroethylene and perfluoro(propyl vinyl ether) (TFE/PPVE copolymer) the film was 30 cm wide and the stretch zone was 1.75 cm, resulting in a ratio of width to zone length of 17. For the other copolymer the film width was 60 cm and the stretch zone was 1.75 cm, resulting in a ratio of width to zone length of 34.

These stretched films were heat set by wrapping them about 180° on a 45 cm diameter hot roll followed by a like wrap on a cold roll of the same diameter. No nips were used, no relaxation taken. For the TFE/PPVE copolymer, the first roll was heated to 300°.C. For the copolymer of tetrafluoroethylene/hexafluoropropylene (TFE/HFP copolymer), the first roll was heated to 270° C. The film speed was 900 cm./min. which permitted a 3 second dwell time on the hot roll. The films were tested for dimensional stability by the procedures described hereinabove at 200° C. Results were as follows:

| | Dimensional Stability at 200° C. (% change) | | | |
|---|---|---|---|---|
| | For TFE/PPVE Copolymer | | For TFE/HFP Copolymer | |
| Condition | LD | TD | LD | TD |
| before heat set | 36.2 | 1.0 | 40.7 | 2.3 |
| after heat set | 5.0 | −0.5 | 5.0 | −0.7 |

I claim:

1. A film of a melt fabricable perfluorocarbon copolymer, having a shrinkage of 0 to 10 percent in a first direction in the plane of the film, and a shrinkage of at least 20 percent in a second direction in the same plane as the first and which is perpendicular to the first direction when heated for two minutes at about 50° C. below the crystalline melting point of the polymer.

2. A film of a melt-fabricable perfluorocarbon copolymer, having transverse shrinkage of 0 to 10 percent, and longitudinal shrinkage of at least 20 percent, when heated for two minutes at about 50° C. below the crystalline melting point of the polymer.

3. The film of claim 2 having a transverse tensile modulus that is greater than 70 percent of the longitudinal tensile modulus.

4. The film of claim 3 in which the film exhibits a creep rate that is one-half or less the creep rate of an as-cast film.

5. The film of claim 2, 3 or 4 wherein the melt-fabricable perfluorocarbon copolymer comprises recurring units of tetrafluoroethylene and at least one other perfluorinated ethylenically unsaturated comonomer.

6. The film of claim 5 wherein the other perfluorinated ethylenically unsaturated comonomer is of the formula $R_f{-}(CF_2)_n{-}CF{=}CF_2$, or $R_f{-}O{-}(CF_2)_n{-}CF{=}CF_2$, or $R_f{-}(CF_2)_n{-}O{-}CF{=}CF_2$, or $R_f{-}O(CF_2)_{n'}O{-}CF{=}CF_2$, or mixtures thereof,
wherein n is a cardinal number of 0-10 inclusive and n' is a cardinal number of 1-10, and $R_f$ is perfluorinated alkyl of 1 to 8 carbon atoms inclusive of ω-hydroperfluorinated alkyl of 1 to 8 carbon atoms, inclusive.

7. The film of claim 5 wherein the other perfluorinated ethylenically unsaturated comonomer is of the formula

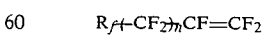

$R_f{-}(CF_2)_n{-}CF{=}CF_2$ wherein $R_f$ is perfluorinated alkyl of 1-8 carbon atoms inclusive, and n is a cardinal number of 0-10 inclusive.

8. The film of claim 5 wherein the other perfluorinated ethylenically unsaturated comonomer is of the formula

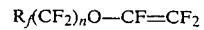

$R_f(CF_2)_nO{-}CF{=}CF_2$ wherein $R_f$ is perfluorinated alkyl of 1–8 carbon atoms inclusive and n is an integer of 0–10 inclusive.

9. The film of claim 7 wherein the comonomer has the formula $CF_3-CF=CF_2$.

10. The film of claim 8 wherein the comonomer has the formula $CF_3-CF_2-CF_2-O-CF=CF_2$.

11. The film of claim 5 wherein at least two other perfluorinated ethylenically unsaturated comonomers are present and wherein they have the formula $CF_3-CF=CF_2$ and $CF_3-CF_2-CF_2-O-CF=CF_2$.

12. A process for uniaxially stretching a substantially unstretched film of a melt-fabricable perfluorocarbon copolymer comprising:
   (a) providing a pair of adjacent and parallel rolls, one roll having peripheral drive speed slower than that of the other;
   (b) contacting said substantially unstretched film under pressure against the slower driven roll and heating said film so that, in a stretch zone between said pair of rolls the film is at a temperature at least about 40° C. above, and no greater than about 80° C. above, the second order transition temperature of the polymer; the pair of rolls being positioned so that the ratio of film width to stretch zone length is at least about 3,
   (c) feeding said film from said slow roll into contact with and under pressure against the faster driven roll, the difference in peripheral drive speeds between the two rolls being such that the film is stretched between the rolls to between about 2.5 times the length of the unstretched film and the break point of the film; and then
   (d) holding the film under tension while cooling the film to below the second order transition temperature of the polymer.

13. The process of claim 12 wherein in step (c) the film is stretched to between 2.5 to 4.5 times the length of the unstretched film.

14. The process of claim 13 wherein the rolls are positioned so that the ratio of film width to stretch zone length is at least 10.

15. The process of claim 12, 13 or 14 wherein the melt-fabricable perfluorocarbon copolymer comprises recurring units of tetrafluoroethylene and at least one other perfluorinated ethylenically unsaturated comonomer.

16. The process of claim 15 wherein the other perfluorinated ethylenically unsaturated comonomer is of the formula $R_f-(CF_2)_n CF=CF_2$, or $R_f-O-(CF_2)_{n'} CF=CF_2$, or $R_f-(CF_2)_{n'} O-CF=CF_2$, or $R_f-O-(CF_2)_{n'} O-CF=CF_2$, or mixtures thereof,
wherein n is a cardinal number of 0–10 inclusive and n' is 1–10, and $R_f$ is perfluorinated alkyl of 1 to 8 carbon atoms inclusive or ω-hydroperfluorinated alkyl of 1 to 8 carbon atoms, inclusive.

17. The process of claim 15 wherein the other perfluorinated ethylenically unsaturated comonomer is of the formula $R_f(CF_2)_n CF=CF_2$ wherein $R_f$ is perfluorinated alkyl of 1–8 carbon atoms inclusive, and n is a cardinal number of 0–10 inclusive.

18. The process of claim 15 wherein the other perfluorinated ethylenically unsaturated comonomer is of the formula $R_f(CF_2)_n O-CF=CF_2$ wherein $R_f$ is perfluorinated alkyl of 1–8 carbon atoms inclusive and n is an integer of 0–10 inclusive.

19. The process of claim 17 wherein the comonomer has the formula $CF_3-CF=CF_2$.

20. The process of claim 18 wherein the comonomer has the formula $CF_3-CF_2-CF_2-O-CF=CF_2$.

21. The process of claim 15 wherein at least two other perfluorinated ethylenically unsaturated comonomers are present and wherein they have the formula $CF_3-CF-CF_2$ and $CF_3-CF_2-CF_2-O-CF=CF_2$.

22. A dimensionally stable film comprising a film obtained by heating a film of claim 1 while under tension; said dimensionally stable film having a dimensional change in a first direction in the plane of the film of between 2 and $-2\%$, and a dimensional change of between 0 and 5% in a second direction in the same plane and which is perpendicular to the first direction, when heated for thirty minutes at 200° C., and having a tensile modulus in said first direction at least 1.5 times that of an as-cast film.

23. A dimensionally stable film comprising a film obtained by heating a film of claim 1 while under tension; and dimensionally stable film having a dimensional change in the transverse direction between 2 and $-2\%$, and a dimensional change in the longitudinal direction between 0 and 5% when heated for thirty minutes at 200° C., and having a transverse tensile modulus at least 1.5 times that of an as-cast film.

24. A dimensionally stable film comprising a film obtained by heating a film of claim 1 while under tension; said dimensionally stable film having recurring units of tetrafluoroethylene and at least one other comonomer of the formula $R_f-(CF_2)_n CF=CF_2$, or $R_f-(CF_2)_n O-CF=CF_2$, or mixtures thereof,
wherein n is a cardinal number of 0–10 in inclusive, and $R_f$ is perfluorinated alkyl of 1 to 8 carbon atoms inclusive or ω-hydroperfluorinated alkyl of 1 to 8 carbon atoms, inclusive,
said film having a transverse dimensional change of between 2 and $-2\%$, and a longitudinal dimensional change of between 0 and 5% when heated for thirty minutes at 200° C.; and a transverse tensile modulus of at least 750 MPa.

25. The film of claim 24 wherein the other comonomer is of the formula $R_f-(CF_2)_n CF=CF_2$ wherein $R_f$ is perfluorinated alkyl of 1–8 carbon atoms inclusive, and n is a cardinal number of 0–10 inclusive.

26. The film of claim 24 wherein the other comonomer is of the formula $R_f$―(CF$_2$)$_n$―O―CF=CF$_2$ wherein $R_f$ is perfluorinated alkyl of 1-8 carbon atoms inclusive and n is an integer of 0-10 inclusive.

27. The film of claim 25 wherein the comonomer has the formula CF$_3$―CF=CF$_2$.

28. The film of claim 26 wherein the comonomer has the formula CF$_3$―CF$_2$―CF$_2$―O―CF=CF$_2$.

29. The film of claim 24 wherein at least one other component is a mixture of CF$_3$―CF=CF$_2$ and CF$_3$―CF$_2$―CF$_2$―O―CF=CF$_2$.

30. The process of claim 12, 13 or 14 wherein after holding the film under tension while cooling, the film is heat set by heating it while under restraint.

31. The process of claim 30 wherein the melt-fabricable perfluorocarbon copolymer comprises recurring units of tetrafluoroethylene and at least one other perfluorinated ethylenically unsaturated comonomer.

32. The process of claim 31 wherein the other perfluorinated ethylenically unsaturated comonomer is of the formula $R_f$―(CF$_2$)$_n$―CF=CF$_2$, or $R_f$―O―(CF$_2$)$_{n'}$―CF=CF$_2$, or $R_f$―(CF$_2$)$_n$―O―CF=CF$_2$, or $R_f$―O―(CF$_2$)$_{n'}$―O―CF=CF$_2$, or mixtures thereof, wherein n is a cardinal number of 0-10 inclusive and n' is 1-10, and $R_f$ is perfluorinated alkyl of 1 to 8 carbon atoms inclusive or ω-hydroperfluorinated alkyl of 1 to 8 carbon atoms, inclusive.

33. The process of claim 31 wherein the other perfluorinated ethylenically unsaturated comonomer is of the formula $R_f$―(CF$_2$)$_n$―CF=CF$_2$ wherein $R_f$ is perfluorinated alkyl of 1-8 carbon atoms inclusive, and n is a cardinal number of 0-10 inclusive.

34. The process of claim 31 wherein the other perfluorinated ethylenically unsaturated comonomer is of the formula $R_f$―(CF$_2$)$_n$―O―CF=CF$_2$ wherein $R_f$ is perfluorinated alkyl of 1-8 carbon atoms inclusive and n is an integer of 0-10 inclusive.

35. The process of claim 33 wherein the comonomer has the formula CF$_3$―CF=CF$_2$.

36. The process of claim 34 wherein the comonomer has the formula CF$_3$―CF$_2$―CF$_2$―O―CF=CF$_2$.

37. The process of claim 31 wherein at least two other perfluorinated ethylenically unsaturated comonomers are present and wherein they have the formula CF$_3$―CF=CF$_2$ and CF$_3$―CF$_2$―CF$_2$―O―CF=CF$_2$.

38. A cooking surface having a melt-fabricable perfluorocarbon copolymer film covering the surface, wherein the film has a transverse shrinkage of 0 to 10 percent, and a longitudinal shrinkage of at least 20 percent, when heated for two minutes at about 50° C. below the crystalline melting point of the polymer.

39. A process for covering a cooking surface comprising
  (a) covering the cooking surface with a film defined as in claim 38 and securing the film around the edges of the surface, and
  (b) heating said film to a temperature at or above the second order transition temperature of the film to shrink the film into contact with said cooking surface.

* * * * *